July 24, 1962
C. D. RICHARD ET AL
3,046,555
DEVICE FOR RECORDING THE SPEED OF SHUTTERS IN
PHOTOGRAPHIC APPARATUS
Filed Oct. 21, 1960
3 Sheets-Sheet 1
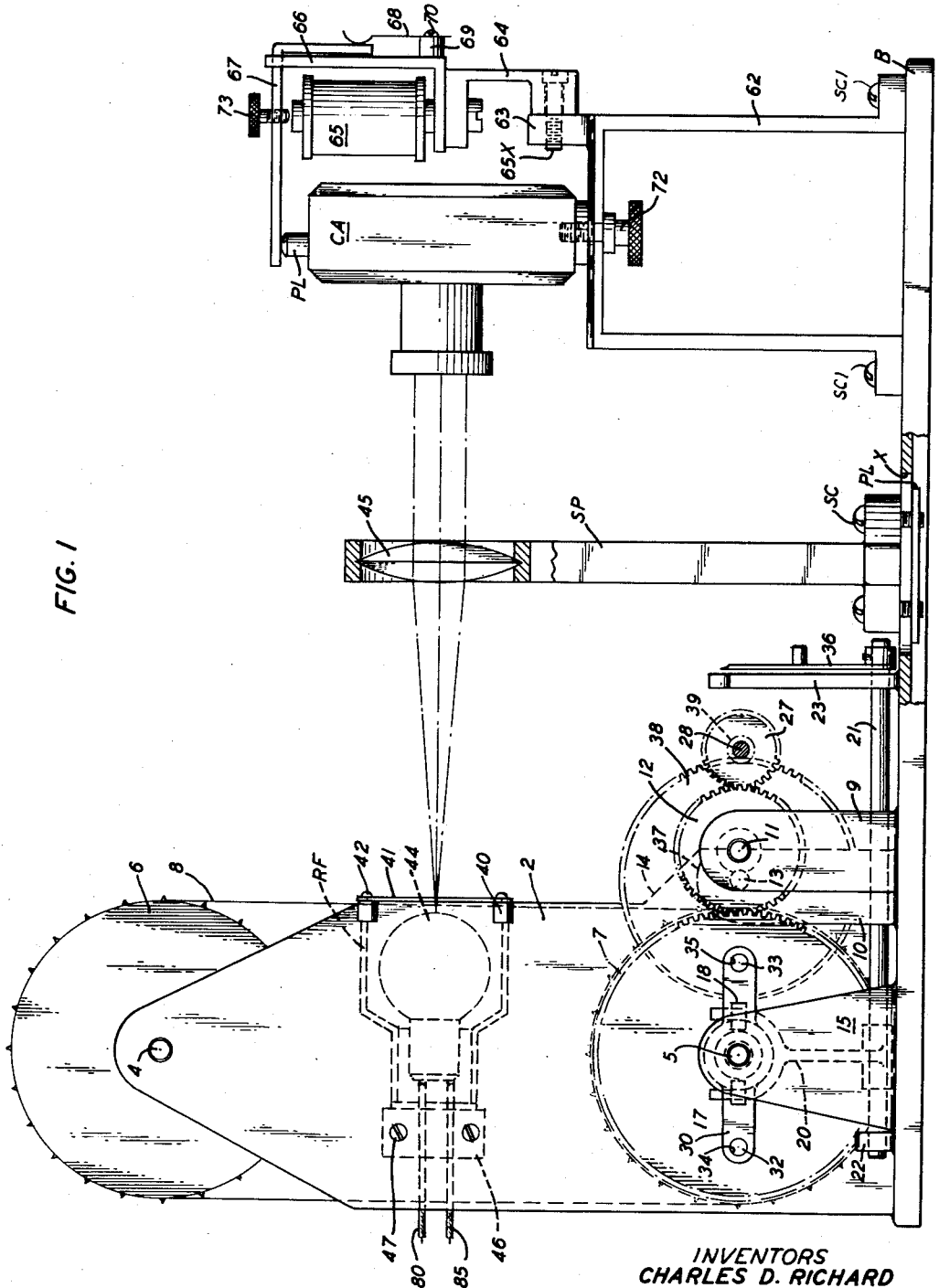
FIG. I
INVENTORS
CHARLES D. RICHARD
ARTHUR W. ZIEGLER
BY
Charles D Richard
ATTORNEY

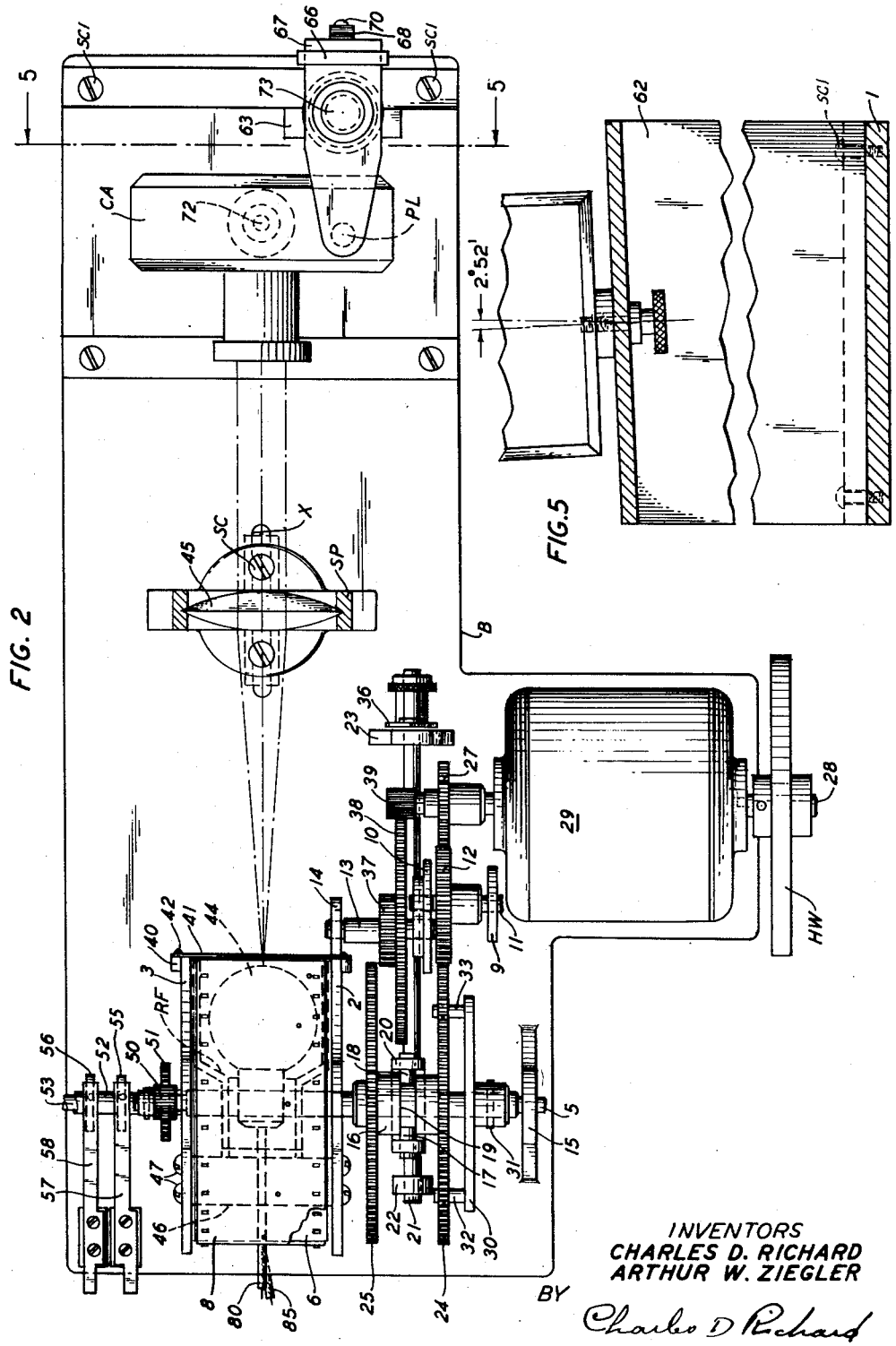

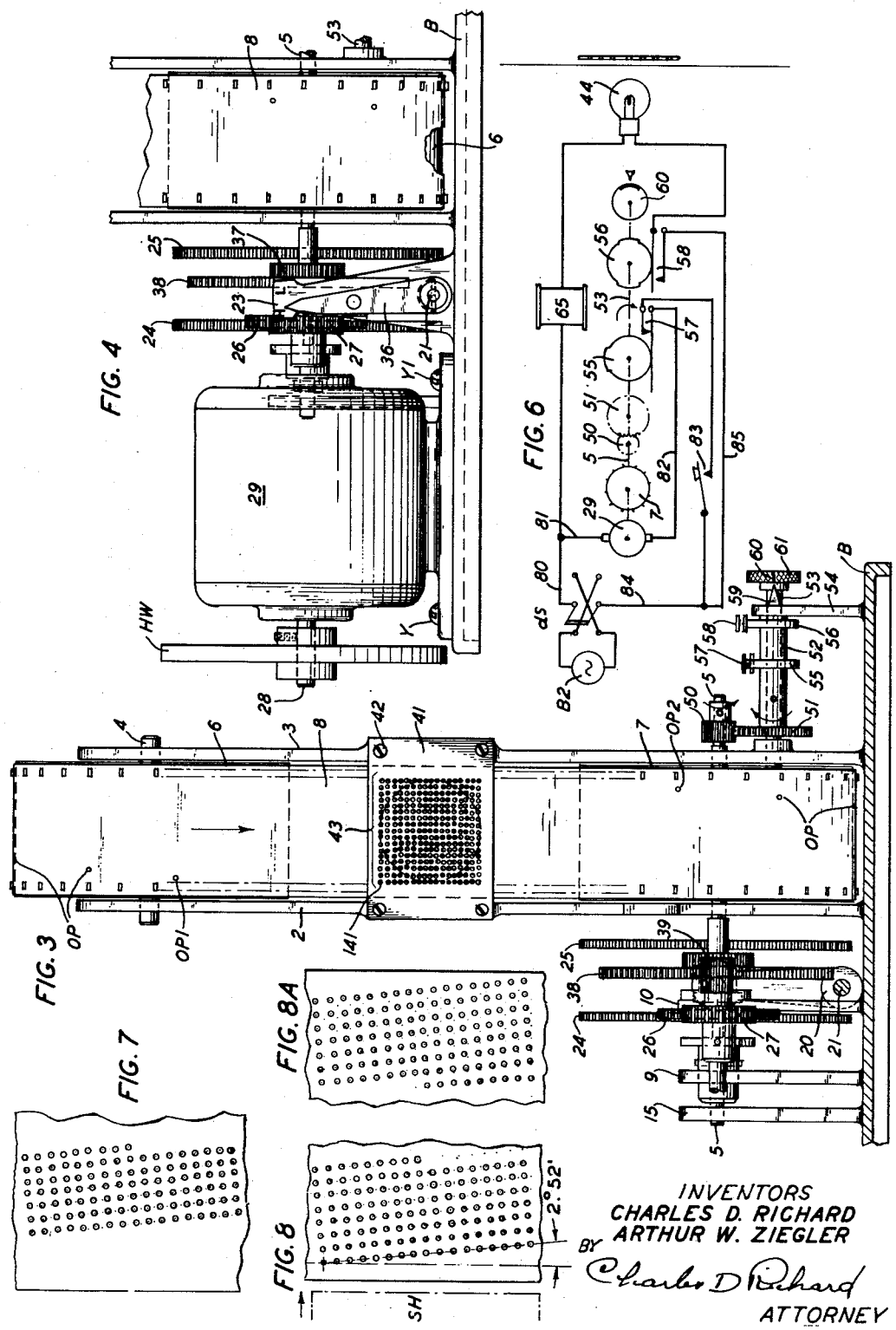

United States Patent Office

3,046,555
Patented July 24, 1962

3,046,555
DEVICE FOR RECORDING THE SPEED OF SHUTTERS IN PHOTOGRAPHIC APPARATUS
Charles D. Richard, Basking Ridge, N.J., and Arthur W. Ziegler, 47 Meadowbrook Road, Short Hills, N.J.; said Richard assignor to said Ziegler
Filed Oct. 21, 1960, Ser. No. 64,147
9 Claims. (Cl. 346—108)

This invention has reference to a device for recording the speed of shutters of the type used in photographic apparatus and the like.

It is an improvement over Patents 2,942,929 and 2,950,163 issued to Arthur W. Ziegler, dated June 28, 1960 and August 23, 1960, respectively.

Patent 2,942,929 discloses a device for recording the speed of shutters in photographic apparatus in which a motor actuates a drum having a perforated rim forming light paths through which light dots or pulses are projected from a lamp inside the drum onto a fixed mirror to be reflected in turn onto a rotary mirror, and from this mirror projected onto a film in the photographic apparatus during the operation of the shutter therein, the number of dots impinged on the film being an indication of the speed of the shutter.

Patent 2,950,163 discloses a device for recording the speed of shutters in photographic apparatus in which the operation of a motor actuates a belt having a plurality of groups of apertures passing in registry to a slit in a plate mounted on a carriage movable with a lamp upon the energization of a magnetic clutch actuated by a gear rack and gearing mechanisms operatively connected to the motor, the light dots generated by the cooperation of the movable lamp, the movable belt, and the movable plate, being projected onto a film in the photographic apparatus during the operation of the shutter as an indication of the speed of such shutter.

The object of the present invention is the provision of a shutter speed testing device in photographic apparatus embodying a minimum number of simple operating parts.

The novel features of this invention will appear from the following description and by the claims appended thereto, reference being had to the accompanying drawing in which:

FIG. 1 is a side elevation assembly view of the shutter speed testing device of the present invention, shown with a number of operating parts partly in section;

FIG. 2 is a top assembly view showing the gear mechanism conditioned for high speed operation of the light dots generating mechanism, a number of operating parts being shown with portions broken away and the support for the focusing lens in section;

FIG. 3 is a front elevation view shown with the base and other operating parts in section;

FIG. 4 is a partial front elevation view shown with the indicator and gear shift mechanism in the position shown in FIG. 2;

FIG. 2 is a partial view of the camera support shown in section, taken on line 5—5 of FIG. 2, with portion broken away;

FIG. 6 is a schematic view of an operating circuit for controlling the operation of the motor, the lamp, and the electromagnet serving for actuating the shutter in the photographic apparatus;

FIG. 7 is a view of a portion of a film showing the pattern of an in-between the lens shutter recorded speed, enlarged, and FIGS. 8 and 8A are views of two portions of a film showing the combined patterns of a focal plane shutter recorded speed operation, enlarged.

The shutter speed recording device of the present invention consists of a base B formed with two upright flanges 2 and 3 serving for rotatably supporting the shafts 4 and 5, on which are keyed the sprocket wheels 6 and 7 adapted to be engaged by a belt 8 in the manner of a film in a moving pictures projector machine, the belt 8 being provided with a series of openings OP, best seen in FIG. 3, forming light paths disposed in one row along its length for a purpose which will be hereafter described in detail.

The base B of the machine is formed, as shown in FIGS. 1, 2 and 3, with upright supports 9 and 10, serving for rotatably mounting a shaft 11 on which is keyed a gear 12, upright support 10 also serving for rotatably mounting one end of a shaft 13, the opposite end of which is rotatably supported in a projection 14 formed at the lower end of flange 2. The shaft 5 on which the lower disposed sprocket wheel 7 is keyed has also one of its ends journaled on an upright support 15 formed with the base B, and on shaft 5 is mounted for sliding movement thereon a hub member 16, FIG. 2, such sliding movement being effected by a forked lever member 20 fitted with pins 17 and 18 at its free end engaging a groove 19 formed in the hub 16.

Forked lever member 20, as shown in FIGS. 1 and 2, is keyed to one end of a shaft 21 rotatably supported at one of its ends in a lug member 22 formed with the base B, and its opposite end in the lower end of an upright support 23, the free end of which serves as a dial having marks H—L shown in FIG. 4, for indicating the position of two similar gears 24 and 25 secured to the opposite end of hub 16.

As shown in FIGS. 2 and 3, gear 24 meshes with the intermediate gear 12 keyed as above mentioned on shaft 11, while gear 12 is disposed in meshing engagement with a gear 27 keyed to the shaft 28 of an 1800 r.p.m. constant speed motor 29 secured to the base B by a number of similar screws Y—Y1 FIG. 4. According to this gearing arrangement the operation of motor 29 is effective to rotate the gears 12 and 24 through gear 27, the gear 24 rotating the shaft 5 and thereby the sprocket wheel 7 keyed thereon by means of a yoke member 30 keyed on shaft 5 by a pin 31, the yoke 30 being provided with two diametrically opposite and laterally extending pins 32 and 33 fitted for free sliding movement into respective bearing openings 34 and 35 in the gear 24.

On the front disposed end portion of shaft 21 is keyed a pointer 36, FIGS. 1, 2 and 4, serving for rotating the shaft 21, a small angular movement from the position marked H for example, to the position marked L on upright support 23 for moving the gear 25 in meshing engagement with a pinion 37, FIG. 2, while moving the gear 24 out of engagement from the gear 12 secured on shaft 11. The pinion 37 is mounted for rotation as a unit with a gear 38, the latter engaging a pinion 39 formed at one end of motor shaft 28. According to this gearing arrangement, considering the gear 25 in engagement with pinion 37, the sprocket wheel 7 is not rotated through pinion 39 carried by motor shaft 28, the gear 38 rotatable as a unit with pinion 37 and gear 25 through yoke member 30 and the shaft 5 on which the sprocket wheel 7 is mounted.

The flanges 2 and 3 are formed at their middle height portions with similar projections 40 serving for securing, as by screws 42, a plate 41 having a number of rows of openings 43 having for example a diameter of .020 of an inch arranged in coordinately disposed rows through which the light from a lamp 44 disposed in juxtaposition to the back side of belt 8, best seen in FIG. 3, may pass upon the operation of the belt when the openings OP of the latter pass in registry successively with their respective row of light openings 43 in the plate 41 to generate light dots or pulses to be impinged onto the film in the photographic apparatus through a focusing lens 45, there being one hole OP for each row of light openings 43 in plate 41.

The lens 45 is mounted at the free end of an upright support SP clamped to the base B by similar screws SC engaging a plate PL disposed to the underside of base B, the base having an elongated opening X, shown in FIG. 1, to permit the adjustment of the lens as to focus relative to the lamp 44.

The lamp 44 is mounted into a reflector RF forming part of a spacer bar 46 secured to the flanges 2 and 3 by similar screws 47, electrical connections to the lamp being effected through the wires 80 and 85.

On the end of shaft 5 which protrudes through the outerside of flange 3, is keyed a pinion 50 meshing with a gear 51 secured to one end of a sleeve 52, FIGS. 2 and 3, sleeve 52, in turn, is keyed on a shaft 53 mounted for rotary movement in a bearing formed in the flange 3 and on an upright support 54 extending from the base B, and on sleeve 52 are mounted the cams 55 and 56 serving for actuating respective contacts 57 and 58, the upright support 54 being provided with a pointer 59 cooperating with a line mark 60 printed on wheel 61, shown in FIGS. 3 and 6, for indicating the starting operation of the motor and thereby of the belt 8 in any one of two opposite directions by the operation of double throw switch ds, while a hand wheel HW secured to the motor shaft 28 serves for manually rotating the motor and moving the belt to either one of the two starting positions following each testing operation.

Onto the base B, as shown in FIGS. 1, 2 and 5, is mounted an inverted U-shaped support 62 held securely onto the base B by a number of similar screws SC1. The top disposed surface of support 62, as shown in FIGS. 1 and 5, has an incline of two degrees and fifty-two minutes relative to the vertical axis of belt 8 in order to produce for example a pattern of speed record as shown in FIG. 8 in connection with the testing of a focal plane shutter as will be hereinafter described in detail.

Support 62 is formed with an upwardly extending lug member 63, FIGS. 1 and 2, to which is secured, as by screws 65x, a support 64 serving for mounting an electromagnet 65 having a pole piece 66, and armature 67, while a screw 73 serves for adjusting the movement of the armature 67 relative to the plunger PL of the camera CA. A retractile spring 68 for the armature is secured at its lower disposed end to a spacer ring 69 by a screw 70, while the pole piece 66 and electromagnet 65 are secured to the support 64 collectively by an ordinary screw threading through the core of the magnet, the U-shaped support 62 being provided with a screw opening for freely receiving a thumb-screw 72 serving for securing the camera CA onto the top surface of support 62, as shown in FIGS. 1, 2 and 5.

In the electrical circuit used for controlling the operation of the testing device in a shutter speed recording operation, the constant speed motor 29, as shown in FIG. 6, connects to a source of A.C. current B2 through the double-throw switch ds the conductors 80 and 81 to one pole of the motor and the other pole by conductor 82, the latter including a normally closed contact 57 arranged to be controlled by the rotation of cam 55, a manually operable switch 83, and the wire 84. Another circuit for the lamp 44 and electromagnet 65 includes the conductor 80 connecting with electromagnet 65, the lamp 44, the normally open contact 58 controlled by the rotation of cam 56 and the conductor 85 connecting with wire 84. The operation of the double throw switch ds being effective to reverse the direction of rotation of motor 29 and thereby of the sprocket wheel shaft 5 and shaft 53 when in the testing of a focal plane shutter, as will be hereinafter described in detail.

In an actual shutter speed testing operation of an in-between the lens shutter for example, the manual closing operation of double throw switch ds, FIG. 6, prepares the circuit for the constant speed motor 29 through the conductors 80 and 81 to one pole of the motor, and through conductor 82 to the closed contact 57 and wire 84, including the normally open manually operable switch 83, the closing of the latter being effective to energize the motor 29 for rotating the sprocket wheel 7 and thereby imparting movement to the belt 8 in the direction indicated by the arrow in FIG. 3.

The first distance between the light path opening in the row 141 in the screen plate 41 and the first light opening OP1 in the belt associated with that row considering the direction of movement of the latter has been arbitrarily made equal to twice the length between the vertical row of light openings in the screen plate for permitting the motor 29 to reach its normal speed prior to a recording operation which is timed to occur upon the passing of the light opening OP1 in registry with the light opening 141 in the screen plate and the closing of contact 58 by the rotation of cam 56 to cause the energization of the lamp 44 and of magnet 65, the armature of which operates the plunger PL in the photographic apparatus, and this followed by the opening of contact 57 by the continued operation of shaft 53 and cam 55 for opening the motor circuit when the manually operable switch 83 may be moved in the open position, thus stopping that movement of the motor and consequently that of the belt, which stop may be at any position between the light path OP1 in the belt and the light path 141 in the screen plate. Under this condition, the knob 61 may be manually rotated to position, the line mark 60 in registry with the index 59, which rotation sets the belt to the starting position and the recording device is now ready for a succeeding operation.

The shutter recorded speed of the camera as shown in FIG. 7 indicates, as an example, that seven consecutive light paths OP in the belt have passed in registry with seven vertical rows of light path openings 43 in the screen plate. The time required for the belt for effecting such linear distance, translated into the number of dots recorded in the film in the photographic apparatus, being an indication of the speed of the shutter under test. The speed of the belt and the number of light paths in the screen plate 41 may be chosen according to the accuracy of the test desired, which, according to the gearing mechanisms above described, produce 500 light dots in one second at the low speed, and 5,000 light dots in one second at the high speed, the distance between two dots in the present example being equal to one five hundredth of a second at the low speed, and one five thousandth of a second at the high speed.

In a testing operation of a focal plane shutter, the double throw switch is operated in the manner above described in connection with the testing operation of an in-between the lens shutter, and the recorded speed may be similar to that shown in FIG. 7, that is for an in-between the lens shutter. However, it is to be noted that the focal plane shutter SH which has a unidirectional movement as indicated by the arrow, FIG. 8, which is also the direction of the progression of light openings OP in the belt toward the right of the screen plate, as viewed in FIG. 3, has the effect of negativing the operation of the belt while the two degrees and fifty-two minutes inclination of the camera on its support 62 in this example permits the consecutive recording of the light dots in the direction of movement of the focal plane shutter relative to the position of the screen plate.

A second test of such shutter is then effected by reversing the direction of rotation of motor 29 by operating the double throw switch in the opposite direction to that of the position in the testing of an in-between lens shutter, in that reverse direction the light paths OP in the belt progress in the direction opposite to that of the focal plane shutter, resulting in the speed record as shown in FIG. 8A, having additional vertical columns of light dots over that of the previous speed record shown in FIG. 8, the adding of the number of light dots in the two records, FIGS. 8 and 8A, and taking the average of such numbers a true speed record of the focal plane shutter tested is obtained.

What we claim is:

1. A device for recording the speed of a shutter in a photographic apparatus, said device comprising a pair of sprocket wheels, a belt connecting said wheels, a motor, a gearing mechanism connecting one of said wheels to said motor, a plurality of light openings arranged in staggered relation to each other along the length of said belt, a stationary screen plate having a plurality of light openings arranged in rows disposed in the direction of movement of said belt, one of said light openings in said belt for each row of light openings in said screen plate, the light openings in said screen plate forming a geometrical figure representing a square, a lamp cooperating with said belt and said stationary screen plate for generating light pulses upon the operation of said belt relative to said screen plate, a plunger in the photographic apparatus operable for actuating the shutter therein for transmitting the light pulses onto a film in such photographic apparatus for recording the speed of such shutter in term of the number of light dots printed on the film.

2. A device for recording the speed of a shutter in a photographic apparatus, said device comprising a pair of sprocket wheels, a belt connecting said wheels having a row of light openings therein disposed in staggered relation to each other, a gearing mechanism connecting one of said sprocket wheels and said motor for actuating said belt, a stationary screen plate disposed in juxtaposition to said belt having a plurality of parallely disposed rows of light openings, one row for each of the light openings in said belt, a plunger in the photographic apparatus for actuating the shutter therein, a stationary lamp disposed in juxtaposition to said screen plate and said belt and cooperating with said belt and said stationary screen plate for generating light pulses upon the movement of said belt, electromagnetic means operable for actuating the plunger in the photographic apparatus, and a cam shaft actuated by said gearing mechanism for controlling the operation of said electromagnet and said lamp in timed relation with the operation of said belt for recording the speed of such shutter in term of the number of light dots passing through the parallel rows of light openings in said screen plate impinged onto a film in the photographic apparatus.

3. A device for recording the speed of a shutter in a photographic apparatus, said device comprising a base, a pair of flange elements carried by said base extending upwardly therefrom in parallel spaced relation to each other, a screen plate securely mounted on said elements having a plurality of openings forming light paths arranged in coordinately disposed rows, a pair of rotatable sprocket wheels mounted in vertical superposed spaced relation on said flange elements, a belt mounted on said sprocket wheels having its length disposed in vertical alignment to the ordinate row of light paths in said screen plate, said belt having staggered light openings therein, one light opening for each row of light openings in said screen plate, a motor mounted on said base, a gearing mechanism operatively connecting one of said sprocket wheels to said motor, a lamp secured on said flange elements disposed in juxtaposition to said belt and said screen plate for generating light pulses upon the operation of said belt for positioning the light openings therein in registry with the light openings in said screen plate, and electromagnetic means operable simultaneously with the energization of said lamp to cause the operation of the shutter in the photographic apparatus for recording the number of light dots projected onto a film in such photographic apparatus.

4. A device for recording the speed of a shutter in a photographic apparatus, said device comprising a base, upright extending flange elements carried by said base, a sprocket wheel mounted for rotation on said elements in position adjacent said base, another sprocket wheel mounted at the top disposed end portions of said flange elements, a belt having means for engaging said sprocket wheels, a motor, a gearing mechanism operatively connecting the first mentioned sprocket wheel to said motor for actuating said belt, a stationary screen plate having light paths arranged in rows, said plate being secured on said flange elements in juxtaposition to the straight front side of said belt, a plurality of light paths disposed in staggered relation to each other in said belt, one for each row of light paths in said screen plate, and a lamp secured to said flange elements to the inner disposed side of said belt opposite to said screen plate for transmitting light pulses onto a film in the photographic apparatus upon the operation of said lamp and said belt and the operation of the shutter in such apparatus.

5. A device for recording the speed of a shutter in a photographic apparatus having a plunger, said device comprising a base, flange elements extending upwardly from said base in parallel spaced relation to each other, a motor, sprocket wheels mounted on said flange elements, a belt connecting said sprocket wheels having light openings therein, one of said sprocket wheels having a shaft extending from the outer disposed sides of said flange elements, a gearing mechanism operatively connecting said shaft at one end to said motor, a screen plate mounted on said flange elements in juxtaposition to one side of said belt, said screen plate having light openings disposed in parallel rows arranged along the line of movement of said belt, one row for each light opening in said belt, a pinion keyed on said shaft at the opposite end thereof, another shaft having a gear disposed in meshing engagement with said pinion, a plurality of cams mounted on the last mentioned shaft, contacts disposed in operative relation with said cams, a lamp disposed in juxtaposition to the opposite side of said belt in axial alignment with said screen plate, an electromagnet having its armature disposed in operative relation with the plunger in the photographic apparatus, an energizing circuit for said motor, said lamp and said electromagnet controlled by the operation of said contacts upon the rotation of said cams to cause the operation of said lamp and said electromagnet in timed relation with the operation of said belt for transmitting light pulses onto a film in the photographic apparatus, the number of light dots impinged on a film in the photographic apparatus being a record of the speed of the shutter in such apparatus.

6. A device for recording the speed of a shutter in a photographic apparatus, said device comprising a base, a pair of upright extending flange elements carried by said base disposed in parallel spaced relation to each other, a motor secured to said base, a rotatable shaft mounted on said flange elements in position adjacent said base, a sprocket wheel disposed between said flange elements keyed to said shaft, another sprocket wheel mounted for rotation between said flange elements at the top end portions thereof, a belt engaging said sprocket wheels, light openings formed in said belt disposed in spaced relation to each other along a length portion thereof, a screen plate secured to said flange elements in juxtaposition to one side of said belt, said screen plate having light openings arranged in rows disposed in line relative to the movement of said belt, one row for each light opening in said belt, a lamp disposed in juxtaposition to said belt on the side opposite the position of said screen plate, speed gear mechanisms for connecting said motor to said sprocket wheels for actuating said belt for successively positioning the light openings therein in registry with the light openings in said screen plate for transmitting light pulses into a film in the photographic apparatus upon the operation of said lamp and said belt, said speed gear mechanisms comprising a hub member mounted for sliding movement on said rotatable shaft, a pair of similar gears carried by said hub member, one of said gears having bearing openings through the wall thereof, a yoke member keyed on said rotatable shaft having laterally extending stud members engaging said bearing openings for rotating said gears in said pair, a groove formed in said hub member, upright extending lug members formed with said base, a shaft supported by said lug members, a forked lever member keyed to one end of the last mentioned shaft having means for engaging the groove in said hub member for moving the gears in said pair in engagement with respectively associated gears in said speed gear mechanisms for actuating said belt at different speed selectively, and a pointer keyed to the opposite end of the last mentioned shaft for indicating the position of said gears in said pair relative to respective gear in said speed gear mechanisms.

7. A device for recording the speed of a shutter in a photographic apparatus, said device comprising a base, a pair of upright flange elements carried by said base, a pair of sprocket wheels, a shaft for each of said sprocket wheels mounted for rotation on said flange elements, a hub member mounted for sliding movement on one end of one of said shafts, a pair of similar gears carried by said hub member, a belt fitted over said sprocket wheels having light paths therein, a screen plate secured to said flange elements, said screen plate having light paths therein, a lamp cooperating with said belt and said screen plate for transmitting light pulses onto a film in the photographic apparatus for recording the speed of a shutter therein, a motor mounted on said base, gear speed mechanisms for actuating said belt at different speeds selectively, said mechanisms comprising a gear and a pinion carried by the motor shaft at one end thereof, an intermediate gear engaging the gear on the motor shaft and one of said similar gears for actuating the last mentioned shaft at one of said speeds, a support carried by said base, a gear-pinion unit having a shaft rotatably mounted on said support and on one of said upright flange elements, the other of said similar gears engaging the pinion of said gear-pinion unit upon the sliding movement of said hub member for operating said last mentioned shaft at another speed, manually operable means for effecting the movement of said hub member for positioning said similar gears in position for disengaging one of said similar gears from said intermediary gear and engaging the other of said similar gears with the pinion of said gear-pinion unit, and a pointer carried by said manually operable means for indicating the position of each of said similar gears in said gear speed mechanisms.

8. A device for recording the speed of a shutter in a photographic apparatus, the apparatus having means for operating such shutter, said device comprising a base having upright supporting flange elements, a reversible constant speed motor mounted on said base, a stationary plate mounted on said elements having light paths therein arranged in coordinately disposed rows, sprocket wheels mounted on said supporting elements, a belt mounted for operation on said sprocket wheels, one of said wheels having a shaft connected to said motor for operation in either direction of the latter, light openings in said belt disposed in a row in a length portion thereof, electromagnet for operating the shutter actuating means, an electrical circuit for energizing said motor to cause the operation of said belt, said lamp and said electromagnet for transmitting light pulses through the light openings in said screen plate onto a film in the photographic apparatus, the other length portion of said belt defining starting positions for the belt relative to the light openings in said plate in either of said operating directions of said motor, and means carried by said shaft for indicating said starting positions.

9. A device for recording the speed of a focal plane shutter in a photographic apparatus, said device comprising in combination a lamp, a stationary plate disposed in juxtaposition to said lamps, said plate having light openings therein disposed in coordinate rows, a belt having light openings therein, one opening for each ordinate row of openings in said plate, said belt operable for transmitting light pulses onto a film in the photographic apparatus, and a support for such apparatus having a bearing surface disposed at an angle relative to the position of the ordinate rows of light openings in said plate for recording the light pulses at a corresponding angle onto the film in the photographic apparatus.

References Cited in the file of this patent
UNITED STATES PATENTS

| | | |
|---|---|---|
| 2,296,676 | Kearsley | Sept. 22, 1942 |
| 2,950,163 | Ziegler | Aug. 23, 1960 |